(12) United States Patent
Balasubramanian et al.

(10) Patent No.: US 12,147,321 B2
(45) Date of Patent: Nov. 19, 2024

(54) SYSTEM AND METHOD FOR MEMORY-PRESSURE AND PROCESSOR USAGE VISUALIZATION

(71) Applicant: ARRIS ENTERPRISES LLC, Suwanee, GA (US)

(72) Inventors: Sundaramoorthy Balasubramanian, Bangalore (IN); Parthipan Ponnuraj, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 186 days.

(21) Appl. No.: 17/516,053

(22) Filed: Nov. 1, 2021

(65) Prior Publication Data

US 2022/0197772 A1   Jun. 23, 2022

Related U.S. Application Data

(60) Provisional application No. 63/129,809, filed on Dec. 23, 2020.

(51) Int. Cl.
*G06F 11/00* (2006.01)
*G06F 9/50* (2006.01)
*G06F 11/30* (2006.01)
*G06F 11/32* (2006.01)

(52) U.S. Cl.
CPC .......... *G06F 11/328* (2013.01); *G06F 9/5016* (2013.01); *G06F 11/3037* (2013.01); *G06F 11/3075* (2013.01)

(58) Field of Classification Search
CPC .............. G06F 11/328; G06F 11/3037; G06F 11/3075; G06F 11/324; G06F 11/3409; G06F 11/32; G06F 11/321
See application file for complete search history.

(56) References Cited

U.S. PATENT DOCUMENTS

| | | | |
|---|---|---|---|
| 2006/0136764 A1 | 6/2006 | Munguia | |
| 2009/0276600 A1* | 11/2009 | Wallman | G06F 9/5016 711/170 |
| 2013/0067381 A1* | 3/2013 | Yalovsky | G06F 11/321 715/772 |
| 2015/0095521 A1 | 4/2015 | Hackborn et al. | |
| 2015/0113579 A1* | 4/2015 | Baek | H04N 21/4532 725/110 |
| 2017/0048341 A1 | 2/2017 | Karakotsios et al. | |
| 2017/0329690 A1* | 11/2017 | Cudak | G06F 11/328 |
| 2022/0197772 A1* | 6/2022 | Balasubramanian | G06F 11/3037 |

OTHER PUBLICATIONS

International Search Report and Written Opinion for Application No. PCT/US2021/057569 dated Jan. 31, 2022 (7 pages).

* cited by examiner

*Primary Examiner* — Philip Guyton
(74) *Attorney, Agent, or Firm* — Panitch Schwarze Belisario & Nadel LLC

(57) ABSTRACT

A system and method providing the user of a media gateway appliance ("MGA") with graphical depictions of Linux system memory and Android high zone and low zone memory usage, as well as processor usage. The depictions provide a user with a time line of the MGA's utilization of these resources, enabling a user to obtain a detailed history of system resource use and loading. These detailed depictions can be displayed upon a monitor associated with the MGA, or upon a screen associated with a separate device such as a smartphone, tablet or computer system.

18 Claims, 5 Drawing Sheets

SYSTEM AND METHOD FOR MEMORY-PRESSURE AND PROCESSOR USAGE VISUALIZATION

CROSS-REFERENCE TO RELATED APPLICATION

This application claims the benefit of U.S. Provisional Patent Application No. 63/129,809, filed Dec. 23, 2020, which is incorporated by reference herein in its entirety.

BACKGROUND OF THE INVENTION

The use of broadband media gateway appliances (MGAs") has become almost ubiquitous throughout the world. These devices, such as set-top boxes and cable or optical modems, serve as the primary interface between a user's premises and one or more providers of multimedia and communication services. Typically, MGAs are linked to providers via a cable, optical or satellite network. These devices usually include one or more processors (running a particular operating system) and an associated memory, and are adapted to support and manage multiple processes for the transmission and display of multimedia information in response to programmed instructions and user commands. The finite processing and memory resources available within a given MGA must be managed in a dynamic fashion to properly support the various applications and processes associated with the provision of multimedia services.

In many MGAs, the task of managing this dynamic allocation is relegated to an automatic process supported by the operating system. One example of such is the Low Memory Killer Daemon ("LMKD") within the Android™ operating system. The LMKD is triggered when a low or no application memory situation has been detected by the Android operating system. Upon detection of such, the LMKD acts to terminate background processes (processes not considered essential to an active application) in accordance with a pre-programmed process. This pre-programmed process would request or mandate that one or more processes relinquish memory resources in order to permit reallocation to prioritized applications.

A modified Linux kernel serves as the basis for Android operating systems; all Android operating system functionality resides atop this modified kernel. While the Linux-based nature of the Android operating system provides many advantages, it can also result in certain processes, such as the LMKD, obtaining a compartmentalized or limited view of overall system resources. For example, application memory usage within the modified Linux kernel is segregated into two zones; a low zone and a high zone. If a low or no application memory situation arises within either of these two zones, the LMKD will be triggered. This triggering can occur even if one of the two memory zones has ample storage resources available for use by applications, resulting in the unwarranted limitation or termination of system processes.

Consequently, there exists a need to provide for the dynamic allocation of finite memory resources within an Android environment based upon the total (low zone plus high zone) application memory availability. In addition, it would be advantageous for a memory management process, such as the LMDK, to provide a user of an Android operating system with information as to what demands current processes and applications are placing upon system resources (both processing and memory). Such information would enable a user to better prioritize and allocate system resources so as to best maintain those processes and applications deemed most critical. Ideally, this information would be collected periodically and presented to the user in a readily understandable manner, either upon a display associated with the MGA or upon another appliance/interface accessible by the user.

BRIEF SUMMARY OF THE INVENTION

A system and method providing the user of an MGA with graphical depictions of Linux system memory and Android high zone and low zone memory usage, as well as processor usage. The depictions provide a user with a time line of the MGA's utilization of these resources, enabling a user to obtain a detailed history of system resource use and loading. These detailed depictions can be displayed upon a monitor (such as a television) associated with the MGA, or upon a screen associated with a separate device such as a smartphone, tablet or computer system.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
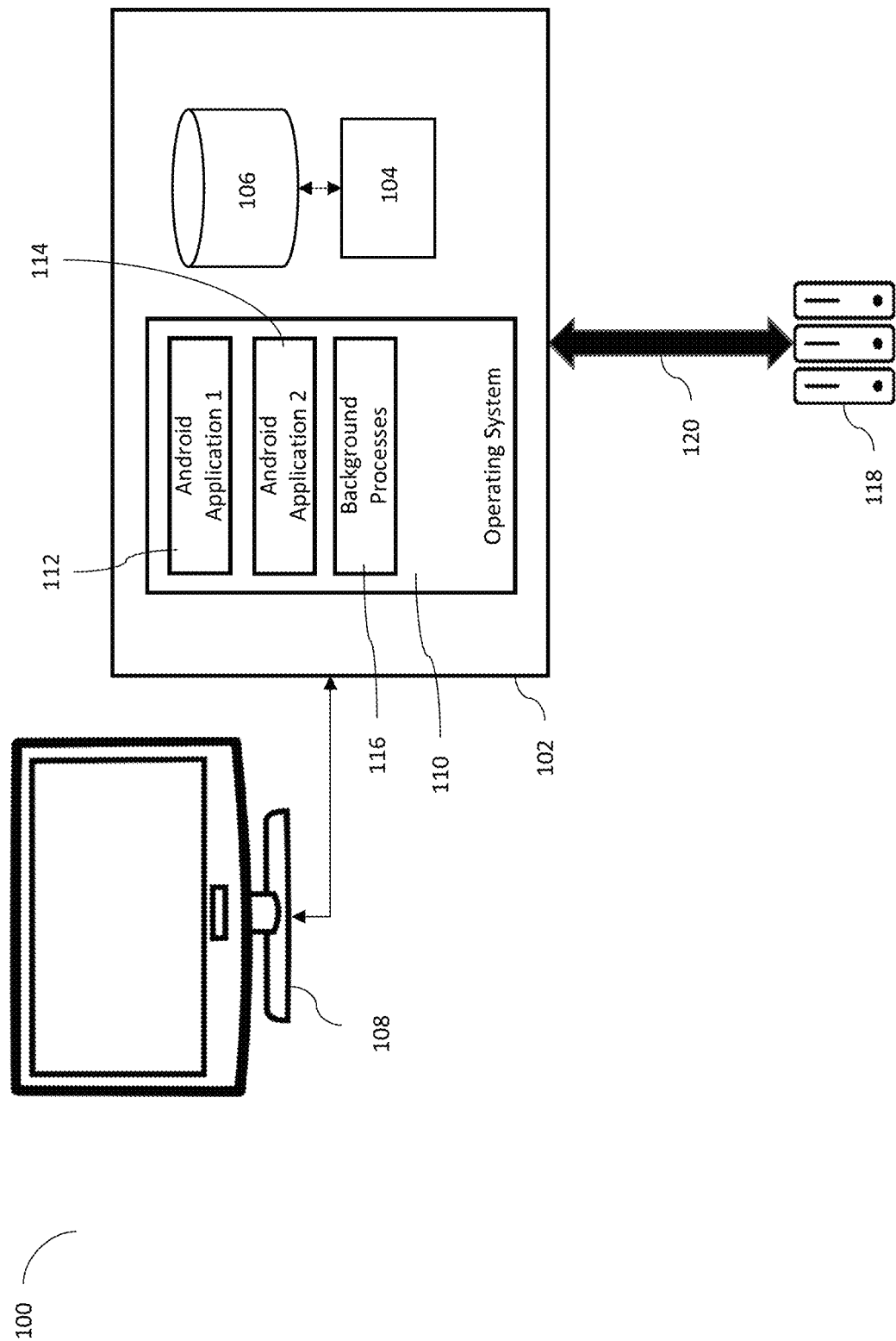
FIG. 1 is a functional block diagram of a first embodiment of a system adapted to support device memory-pressure and processor usage visualization.

FIG. 1 is a functional diagram of a memory structure first preferred embodiment of a system (100) adapted to support device memory-pressure and processor usage visualization. As shown, MGA 102, such as a media gateway appliance or set-top box adapted for use within a broadband multimedia system, includes processor 104, memory 106, and video monitor 108. Processor 102 and memory 104 are adapted to support an operating system (110) based upon a modified Linux kernel. As shown, processor 104 and memory 106 are further adapted to support two Android processes (112, 114) and various background processes (116) executing within the operating system (110) environment.

MGA 102 is also shown to be linked to server 118 via broadband link 120.

Broadband link 120 can be supported by a wired or wireless network, or combination thereof. Server 108 includes one or more processors and associated memory adapted to execute periodic inquiries upon MGA 102. These inquiries utilize known Linux kernel and Android system memory usage. This information is then processed at server 108 to render a complete profile of MGA 102 memory usage.

In particular, the processing performed by server 108 utilizes the information from MGA 102 to derive diagnostic information reflective of the following:

Linux memory usage;
high zone Android memory usage;
low zone Android memory usage;
total application memory usage;
individual application memory usage;
background processes memory usage;
application processor usage; and
graphic processing memory usage.

All of the above listed memory and processor information is collected at pre-defined intervals from MGA 102, thereby enabling the processing at server 108 to compile a time-stamped history of the diagnostic information.

The compiled diagnostic information is then formatted by server 118 into graphical histograms representing one or more of the above listed diagnostic variables. This graphical information is then provided to MGA 102 via broadband link 120. A user may then access the information for display upon video monitor 108. This access may be accomplished via a user interface associated with MGA 102, such as a keyboard or remote-control unit. For example, a user could access a graphical diagnostic menu displayed upon video monitor 108 and choose the particular diagnostic variable(s) they wished to view. Provision of such graphical menus is well-known in the art and the particulars of such will not be discussed further herein.

Figure 2A:
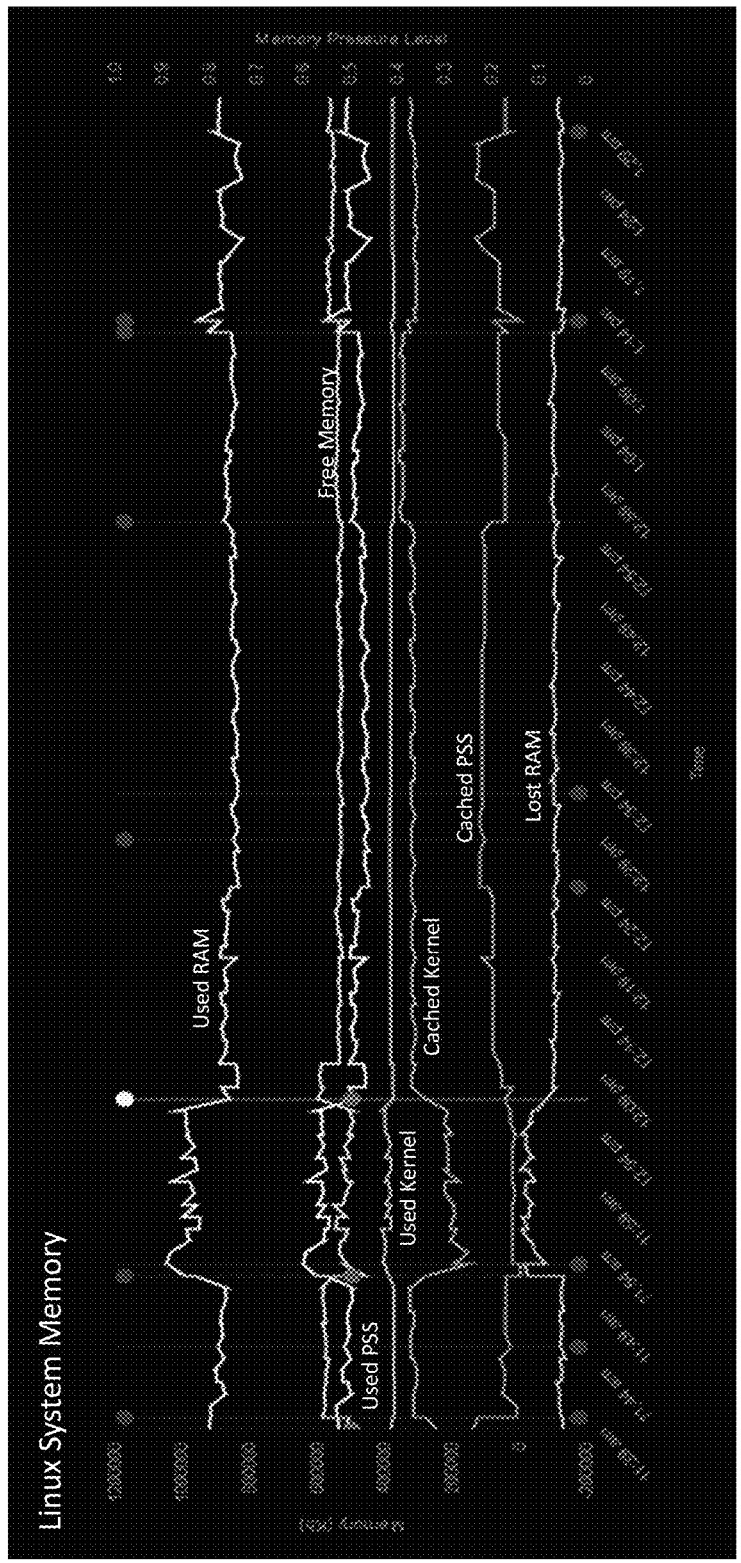
FIG. 2A is a depiction of a user interface display adapted to be utilized with the system of FIG. 1, wherein the display provides a timeline of Linux system memory usage.
Figure 2B:
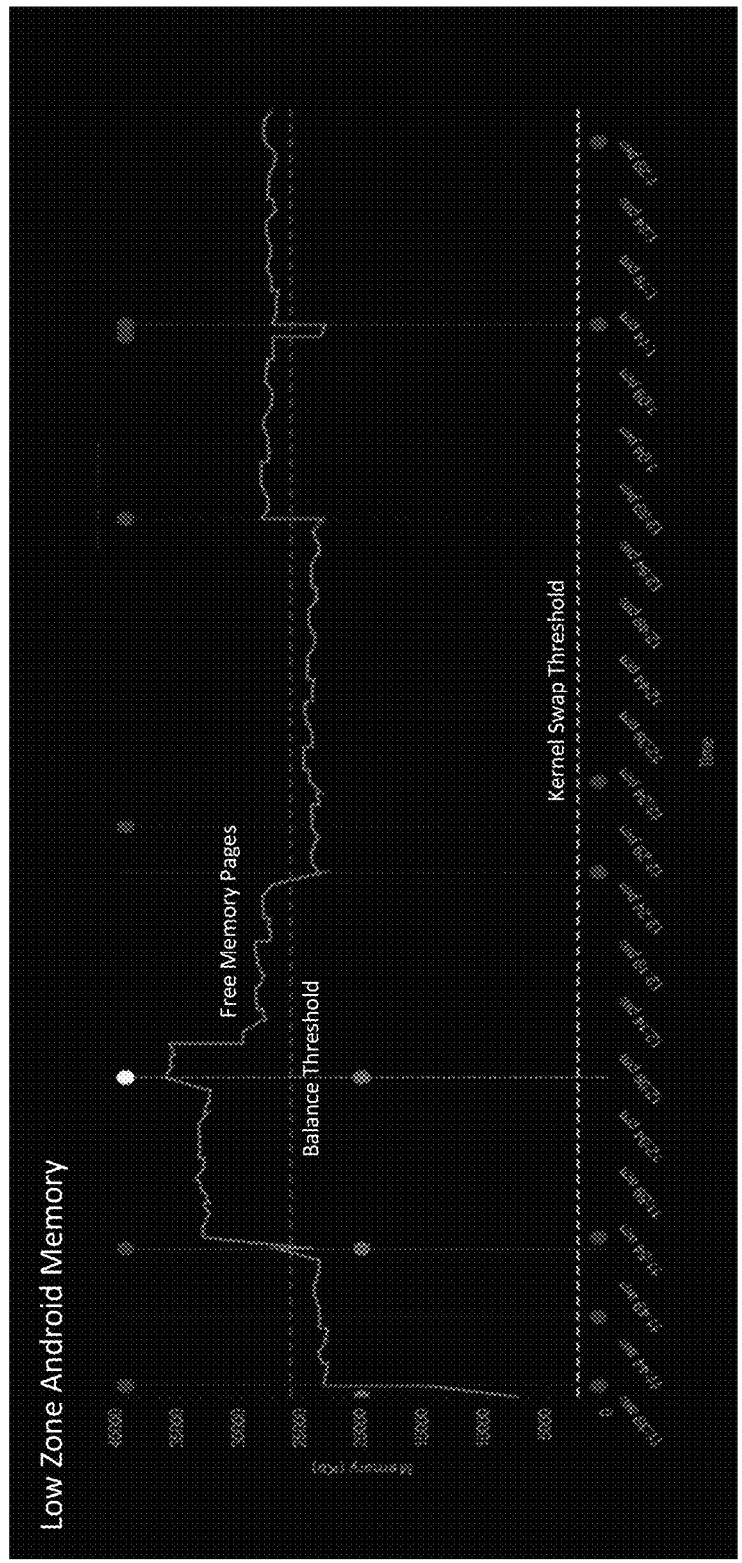
FIG. 2B is a depiction of a user interface display adapted to be utilized with the system of FIG. 1, wherein the display provides a timeline of low zone Android memory usage.
Figure 2C:
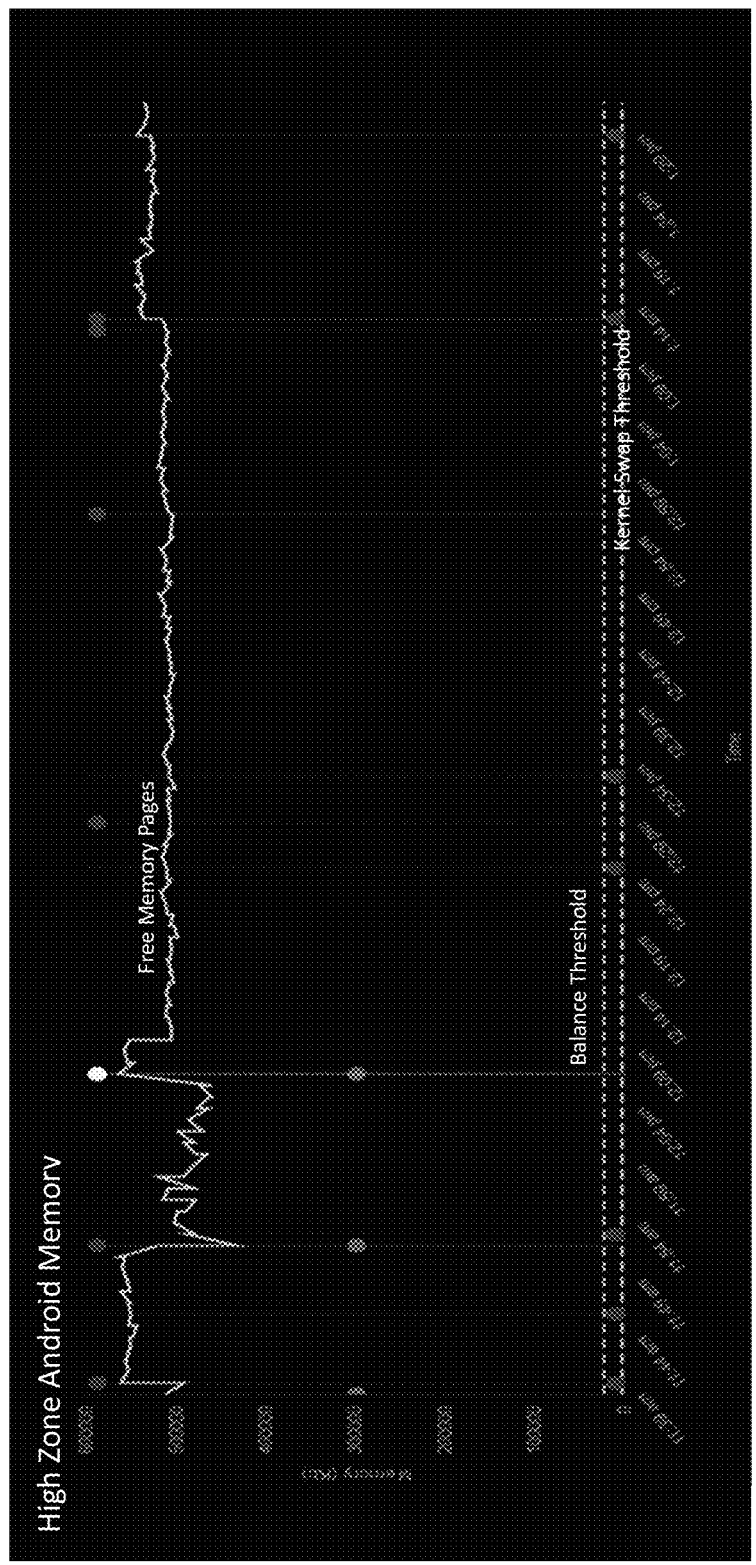
FIG. 2C is a depiction of a user interface display adapted to be utilized with the system of FIG. 1, wherein the display provides a timeline of high zone Android memory usage.

FIG. 2A is a representation of a monitor display providing a user with a timeline of Linux system memory usage. As shown, the display provides information indicative of the amount of used and free random-access memory ("RAM"), cached and used proportional set size ("PSS") within the system memory, the cached and used kernel memory, and the overall level of free memory. FIG. 2B is a representation of a monitor display providing a user with a timeline of low zone Android memory usage. The display provides information indicative of the amount of free memory pages, a memory balance threshold, and the threshold at which the Android process for reducing the number of used pages (the "kernel swap daemon") becomes active. A similar representation for high zone Android memory is provided by FIG. 2C. Processor usage (application, graphic, etc.) would be depicted in a timeline fashion similar to those shown for memory usage in FIGS. 2A-C. A user would access the processor usage timeline via a user interface, in a manner similar to that utilized for accessing the memory usage timelines.

Figure 3:
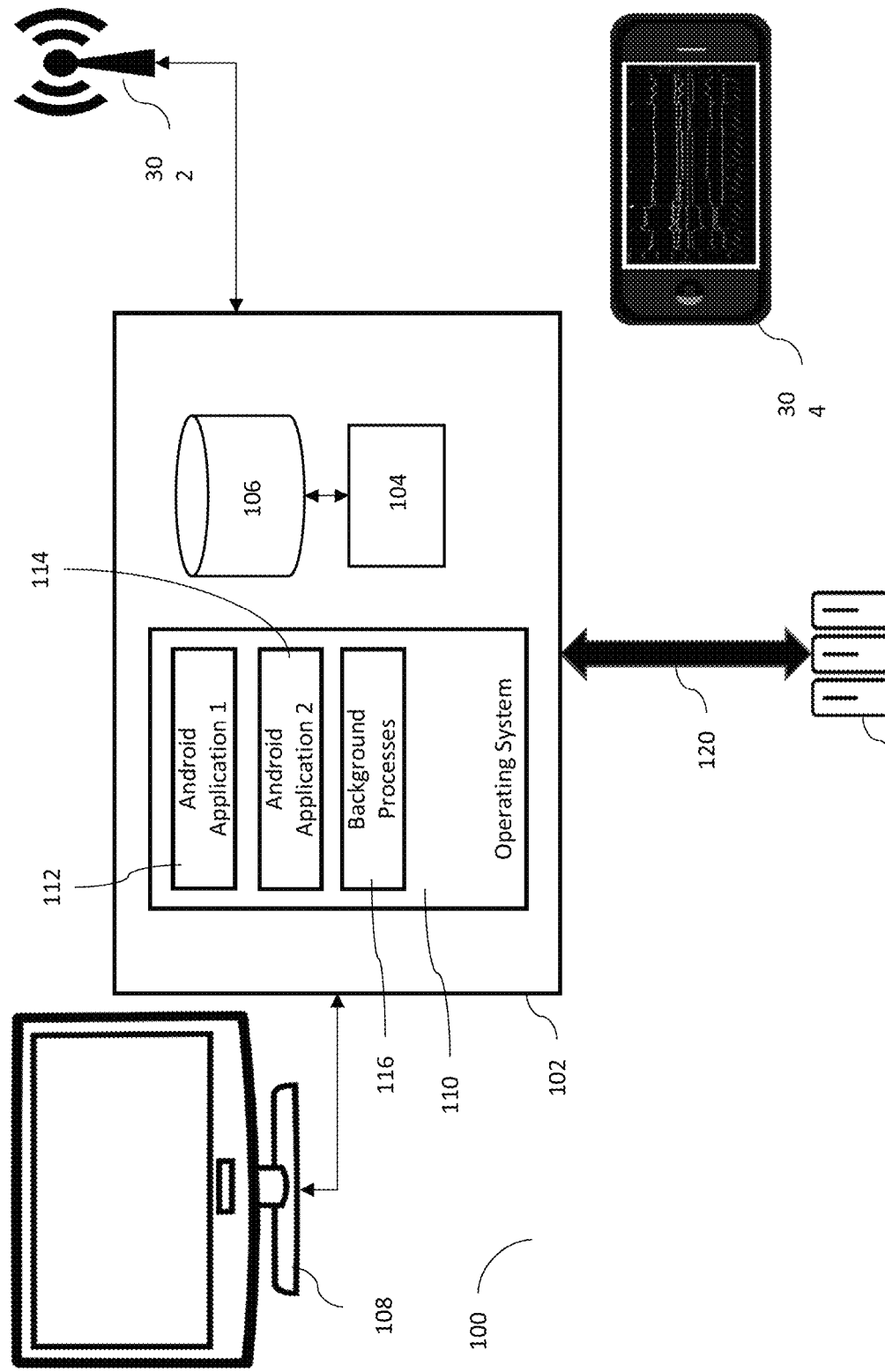
FIG. 3 is a functional block diagram of a second embodiment of a system adapted to support device memory-pressure and processor usage visualization.

A system (300) supporting an alternate preferred embodiment is shown in FIG. 3. System 300 includes all of the elements of system (elements 102-120). The functionality of these elements is substantially the same as was described above with respect to system 100. However, system 300 also includes wireless network 302, which is shown to be linked to MGA 102. Wireless network 302 is adapted to provide wireless bidirectional communication between smart device 304 and MGA 102. Wireless device 304 is programmed to serve as a user interface with respect to accessing the diagnostic information provided to MGA 102 by server 118. The menu(s) for accessing such, as well as the various screens indicative of memory and/or processor usage within MGA 102 will be provided to and displayed upon smart device 304. Wireless device 304 can be a tablet, smartphone, a computer system, digital assistant, etc. The wireless network can be provided in accordance with any suitable protocol for the transmission of digital data, such as a cellular network; an 802.11 network; an 802.15 network, or Bluetooth.

Although the invention herein has been described with reference to particular embodiments, it is to be understood that these embodiments are merely illustrative of the principles and applications of the present invention. For example, the device utilized to interface with the MGA could be any device capable of accepting user commands and providing a graphical display. Furthermore, any of the links or connections described as being wireless could be accomplished via wired means. The converse holds true for any links or connections described as being wired—They could be accomplished via wireless means without departing from the scope of the disclosed invention. It will also be understood that although the processors and memories depicted in the particular embodiments discussed above were described as being contained within or collocated with a particular MGA, the processing and storage functionality associated with these components could be provided by remotely located devices, systems or other assets, linked to the MGA via a public or private network. All of the above variations and reasonable extensions therefrom could be implemented and practiced without departing from the spirit and scope of the present invention as defined by the appended claims.

The invention claimed is:

1. A system for enabling device resource usage visualization, the system comprising:
    at least one display;
    at least one processor;
    at least one memory configured to store information received from the at least one processor; and
    at least one network linking the at least one processor to a first device;
    wherein the at least one processor is configured to:
        periodically obtain resource usage information from the first device over a given interval;
        store the periodically obtained usage information in the at least one memory;
        process the stored usage information to generate diagnostic information;
        compile the diagnostic information into a graphic depiction of the periodically obtained usage information over the given interval; and
        provide the information representing the graphic depiction of the periodically obtained usage information to a display device of the at least one display device, and
    wherein the display device is configured to display at least
        a timeline of system memory usage including (i) an amount of used and free random-access memory, (ii) cached and used proportional set size within the system memory, iii) cached and used kernel memory, and (iv) an overall level of free memory,
        a timeline of low zone memory usage including (i) free memory pages, (ii) a memory balance threshold, and (iii) a threshold at which a process for reducing a number of used pages becomes active, and
        a timeline of high zone memory usage.

2. The system of claim 1 wherein the first device comprises at least one of the following:
    a media gateway appliance;
    a set-top box; and
    a broadband modem.

3. The system of claim 1 wherein the at least one display comprises at least one of the following:

a television;
a smartphone;
a tablet; and
a computer monitor.

4. The system of claim 1, further comprising at least one wireless device adapted to:
  display the information representing the graphic depiction of the periodically obtained usage information; and
  link to the at least one processor by at least one wireless network.

5. The system of claim 4, wherein the at least one wireless network comprises at least one of the following:
  a cellular network;
  an 802.11 network;
  an 802.15 network, and a
  a Bluetooth network.

6. The system of claim 1 wherein the first device comprises a processor adapted to run a Linux kernel operating system.

7. The system of claim 6 wherein the Linux kernel operating system is an Android operating system.

8. The system of claim 1 further comprising a user interface linked to the at least one processor and adapted to receive user commands requesting the display of the graphic depiction of the periodically obtained usage information upon the display device.

9. The system of claim 8 wherein the user interface comprises at least one of the following:
  a remote-control device;
  a mobile device;
  a smartphone;
  a television;
  a tablet; and
  a computer monitor.

10. A method for enabling device resource usage visualization, in a system comprising:
  at least one display;
  at least one memory; and
  at least one network;
  the method comprising the steps of:
    periodically obtaining resource usage information from a first device over a given interval;
    storing the periodically obtained usage information in the at least one memory;
    processing the stored usage information to generate diagnostic information;
    compiling the diagnostic information into a graphic depiction of the periodically obtained usage information over the given interval;
    providing the information representing the graphic depiction of the periodically obtained usage information to a display device of the at least one display device, and
    displaying, by the display device,
      a timeline of system memory usage including (i) an amount of used and free random-access memory, (ii) cached and used proportional set size within the system memory, (iii) cached and used kernel memory, and (iv) an overall level of free memory,
      a timeline of low zone memory usage including (i) free memory pages, (ii) a memory balance threshold, and (iii) a threshold at which a process for reducing a number of used pages becomes active, and
      a timeline of high zone memory usage.

11. The method of claim 10 wherein the first device comprises at least one of the following:
  a media gateway appliance;
  a set-top box; and
  a broadband modem.

12. The method of claim 10 wherein the at least one display comprises at least one of the following:
  a television;
  a smartphone;
  a tablet; and
  a computer monitor.

13. The method of claim 10, further comprising the step of displaying the information representing the graphic depiction of the periodically obtained usage information upon at least one wireless device.

14. The method of claim 13, wherein the at least one wireless device is adapted to link to at least one of the following:
  a cellular network;
  an 802.11 network;
  an 802.15 network, and a
  a Bluetooth network.

15. The method of claim 10 wherein the first device comprises a processor adapted to run a Linux kernel operating system.

16. The method of claim 15 wherein the Linux kernel operating system is an Android operating system.

17. The method of claim 10 further comprising the step of receiving, via a user interface, commands requesting the display of the graphic depiction of the periodically obtained usage information upon the display device.

18. The method of claim 17 wherein the user interface comprises at least one of the following:
  a remote-control device;
  a mobile device;
  a smartphone;
  a television;
  a tablet; and
  a computer monitor.

* * * * *